Patented Sept. 5, 1922.

1,427,979

UNITED STATES PATENT OFFICE.

WILLIAM E. STOKES, OF ROCKVILLE CENTER, NEW YORK, ASSIGNOR TO ROYAL BAKING POWDER COMPANY, OF NEW YORK, N. Y., A CORPORATION OF NEW JERSEY.

EFFERVESCENT MIXTURE.

No Drawing.    Application filed August 11, 1919. Serial No. 316,759.

*To all whom it may concern:*

Be it known that I, WILLIAM E. STOKES, a citizen of the United States, residing in Rockville Center, Nassau County, in the State of New York, have invented new and useful Improvements in Effervescent Mixtures, of which the following is a specification.

The invention relates to improvements in effervescent mixtures. Such mixtures are used as leavening agents and otherwise and have consisted essentially of sodium-bicarbonate, or an equivalent constituent, and an acid constituent, which, in the presence of water or water-containing substances, acts upon the alkali and liberates carbonic acid gas. Bicarbonate of soda being easily available and satisfactory, most of the efforts in the art have been directed towards providing an acid constituent fulfilling and reconciling the practically-conflicting attributes of low cost, effective liberation of gas, production of a reaction residue without injurious effect on the organism, stability when mixed with the bicarbonate, and properly timed reactivity with the bicarbonates for leavening purposes. Generally speaking, acid constituents heretofore used have attained one or more of these attributes at the expense of one or more of the others. Some baking powders comprising bicarbonates are not injurious, but expensive; others are cheap, but of doubtful or worse effect on the organism; others, which might be made both non-injurious and cheap, would not keep or not generate sufficient gas; and so on. The present invention is concerned with providing a constituent to react with the bicarbonate in such mixtures and has for its object the production of effervescent mixtures which, considering all the characteristics to be desired in such mixtures, are useful and valuable and may be regarded as superior to those heretofore known.

I have found that it is practicable to use advantageously in effervescent mixtures a substantially neutral salt of non-volatile acid. This discovery has been made in connection with experiments with substantially neutral calcium-lactate, which, I have found, is exceptionally valuable for the purpose. Without attempting to determine whether this results from a tendency towards the formation of a less soluble salt in the mixture or otherwise, I have found that in fact such calcium lactate has the property of liberating carbon-dioxide from bicarbonates and made use of this discovery in developing the present invention.

Accordingly, a baking powder may be made from calcium-lactate and bicarbonate, to which preferably will be added, as usual, starch, to serve as a filler. Such a baking powder may be taken as representing one form of the invention in its broader aspects; and since it also serves to make plainer the nature and advantages of the preferred form, it may be noted that the reaction using the calcium-lactate either with or without water or hydration is substantially as follows:—

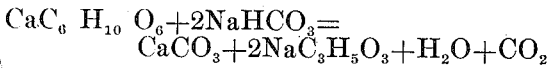

The residue is sodium lactate, a recognized food product. While the use of this neutral, or substantially neutral, salt of non-volatile acid to take the place of the acid constituent presents many advantages, I prefer to use with it another ingredient, so that the preferred constituent will consist of calcium-lactate and another ingredient, preferably one of the acid phosphates. Of the acid phosphates, I prefer to use mono-calcium, although dicalcium, or sodium, or perhaps magnesium and other phosphates, may serve as well. The added advantages of the preferred form are chiefly those which result from the fact that what may be referred to as a secondary reaction is developed, affecting the timing of the leavening action and resulting in a residue, comprising sodium lactate and tricalcium phosphate, (perhaps with some dicalcium phosphate) which is neutral and inert. This secondary reaction may be indicated as follows:—

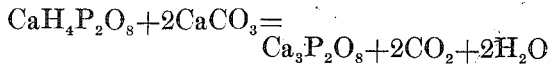

Calcium acid phosphate has heretofore found a place in some baking powders, but such powders have not been satisfactory. In some instances, where the mixture has been of the phosphate, bicarbonate and filler, imperfect stability has resulted, notwithstanding improvements in the character of the phosphate made with that in view. In other instances, to correct this shortcoming, resort has been had to the addition of alum, with the result that the residue has been objectionable. I have found that the use of the neutral organic salt in connection with the phosphate makes, I believe for the first time, a phosphate baking powder of satisfactory stability.

The stability or keeping qualities of the preferred form of my baking powder may be in part explained by the fact that the organic salt acts as a filler, tending to keep the phosphate separated from the bicarbonate; and so I prefer to use the fine particles of neutral calcium-lactate, together with coarse bicarbonate and phosphate. It is not improbable that there is also a chemical reason for the satisfactory result, having to do with the like qualities of the phosphate and the neutral organic salt. Whatever the explanation, I have found by test that a baking powder consisting of a mixture of 6 parts calcium acid phosphate, 7 calcium-lactate, 7 bicarbonate of soda and 5 starch, has 14% available gas and, after being exposed in an open dish to an atmosphere of maximum humidity at 98° F. continuously for 120 hours, lost less than 1.50%, which approximates the loss under similar conditions of the highest grade and most expensive powders and represents much less loss than that of many well known baking powders under like conditions. It will be observed that the preferred mixture has an exceptionally high percentage of available gas. In addition to its strength and keeping qualities, the preferred mixture, partly because of the primary reaction followed by the secondary action, is well timed for leavening purposes; and it is less expensive than other effervescent mixtures of comparable strength, stability and unobjectionableness.

Mixtures containing tartaric acid, in lieu of acid calcium phosphate, have given satisfactory results; and sundry other ingredients, as lactid or cream of tartar, may be used with the calcium lactate. The invention contemplates that such substitutions may be made without departing from the spirit of the invention or the scope of some of the claims hereinafter made.

I claim:

1. A baking powder comprising a carbonate, a substantially neutral calcium lactate and acid phosphate.

2. A baking powder comprising a carbonate, substantially neutral lactate and other ingredient capable of reacting in aqueous solution with a carbonate to liberate carbon-dioxide.

3. A baking powder comprising substantially neutral calcium lactate and a carbonate capable of reacting with the calcium lactate to liberate carbon-dioxide.

WILLIAM E. STOKES.